(12) United States Patent
Baraccani (10) Patent No.: US 10,113,655 B2
(45) Date of Patent: Oct. 30, 2018

(54) ROTARY DISTRIBUTOR

(71) Applicant: GIMA S.p.A., Zola Predosa (Bologna) (IT)

(72) Inventor: Davide Baraccani, Cotignola (IT)

(73) Assignee: GIMA S.p.A., Zola Predosa (Bologna) (IT)

(*) Notice: Subject to any disclaimer, the term of this patent is extended or adjusted under 35 U.S.C. 154(b) by 119 days.

(21) Appl. No.: 15/303,908

(22) PCT Filed: May 4, 2015

(86) PCT No.: PCT/IB2015/053238
§ 371 (c)(1),
(2) Date: Oct. 13, 2016

(87) PCT Pub. No.: WO2015/170236
PCT Pub. Date: Nov. 12, 2015

(65) Prior Publication Data
US 2017/0037979 A1  Feb. 9, 2017

(30) Foreign Application Priority Data

May 6, 2014  (IT) .............................. BO2014A0265

(51) Int. Cl.
*B65G 47/86* (2006.01)
*F16K 11/074* (2006.01)
(Continued)

(52) U.S. Cl.
CPC .......... *F16K 11/074* (2013.01); *B65G 47/846* (2013.01); *B65B 65/00* (2013.01); *F15B 15/20* (2013.01)

(58) Field of Classification Search
CPC ..... B65G 47/846; B65G 47/848; B65G 47/91
(Continued)

(56) References Cited

U.S. PATENT DOCUMENTS 3,592,320 A * 7/1971 Binggeli ................... B23Q 7/04
                                                         198/471.1
4,771,879 A * 9/1988 Shriver ................. B05C 13/025
                                                         198/471.1
(Continued)

FOREIGN PATENT DOCUMENTS

EP    0 783 083 A2   7/1997
EP    1 422 453 A1   5/2004
(Continued)

OTHER PUBLICATIONS

International Search Report and Written Opinion for corresponding Patent Application No. PCT/IB2015/053238 dated Jul. 30, 2015.
(Continued)

*Primary Examiner* — James R Bidwell
(74) *Attorney, Agent, or Firm* — Renner, Otto, Boisselle & Sklar LLP (57) ABSTRACT

A rotary distributor for distributing a pressurized fluid to movable user devices comprises a first element associated with a fixed frame and connected to a fluid source; a selector having a plurality of openings connected to corresponding ducts for passage of the fluid to corresponding movable user devices; and a manifold having a first surface located in front of the first element and a second surface located in front of the selector. The manifold has an opening for passage of fluid between the first element and the selector. The opening has an extension able to touch a number of openings of the selector in movement to allow passage of fluid towards the openings. The opening of the manifold consists of a through slot, open on the first surface located in front of the first element and also open on the second surface located in front of the selector.

18 Claims, 5 Drawing Sheets

(51) Int. Cl.
*B65G 47/84* (2006.01)
*B65B 65/00* (2006.01)
*F15B 15/20* (2006.01)

(58) Field of Classification Search
USPC .............................. 198/471.1, 470.1, 468.4
See application file for complete search history.

(56) References Cited

U.S. PATENT DOCUMENTS

| | | | | |
|---|---|---|---|---|
| 5,725,082 | A * | 3/1998 | Connell | ............... B65G 47/848 198/471.1 |
| 7,770,712 | B2 * | 8/2010 | McCabe | ........... A61F 13/15764 198/463.1 |
| 8,464,856 | B2 * | 6/2013 | Marshall | ................ B21D 51/26 198/459.2 |
| 2009/0256371 | A1 * | 10/2009 | Nankervis | ............... B65B 61/28 294/188 |
| 2009/0269172 | A1 * | 10/2009 | Egerton | ................ B65G 29/00 414/223.01 |
| 2013/0025297 | A1 | 1/2013 | Matsubara et al. | |

FOREIGN PATENT DOCUMENTS

| | | |
|---|---|---|
| EP | 1 642 656 A1 | 4/2006 |
| EP | 1 914 455 A1 | 4/2008 |
| EP | 2 056 005 A2 | 5/2009 |
| EP | 2 465 813 A1 | 6/2012 |

OTHER PUBLICATIONS

Search Report for corresponding Italian Patent Application No. BO2014A000265 dated Jan. 22, 2015.

* cited by examiner

ROTARY DISTRIBUTOR

This application is a national phase of International Application No. PCT/IB2015/053238 filed May 4, 2015 and published in the English language, which claims priority to Italian Patent Application No. BO2014A000265 filed May 6, 2014, which are hereby incorporated herein by reference in their entirety.

TECHNICAL FIELD

This invention relates to a rotary distributor for distributing a pressurised fluid to a plurality of movable user devices and a distribution apparatus for automatic machines. The invention also relates to a process for distributing a pressurised fluid to a plurality of user devices in automatic machines.

BACKGROUND ART

In light of this, there are prior art pneumatic distribution apparatuses used on automatic machines comprising rotary devices or carousels designed for handling components of products (such as for example single pick, movement, releasing in sequence) selectively activated with air using a rotary pneumatic distributor.

Usually, these carousels form parts of stations of automatic machines for forming products such as, for example, single use beverage capsules, in particular capsules for making extraction or infusion beverages such as coffee, tea, milk, chocolate or combinations of these ingredients.

The carousel comprises a body rotating about a vertical axis (or a horizontal axis, or even an axis inclined to the reference planes of the machine) from which a plurality of arms project radially; each of the arms is provided with an operating head equipped with, for example, blower means, for example for cleaning edges of the capsules, before successive steps for sealing portions of closing sheets on the edges, or for driving pneumatic pistons.

In a station comprising this carousel a pneumatic system is necessary for distribution of air under pressure so that it works in phase with the other parts of the machine or, in other words, that the air under pressure is only distributed during predetermined production steps, depending, for example, on the position of the arms, that is to say, of the operating heads between a starting point and an arrival point—and one or more transit points/stretches—which, in the case of rotary carousels, are points/stretches positioned along a closed circular path.

In order to optimise this type of pneumatic operation of the carousel, pneumatic rotary distributors are used which are substantially of two types: radial rotary dispensers and front rotary distributors.

However, both the radial rotary distributors and the front rotary distributors have drawbacks.

More specifically, the radial rotary dispensers have sealing problems, especially if they are used for paths which comprise active paths, that is, paths along which the operating heads are in communication with the source of air, alternated with non-active paths, that is, paths along which the operating heads are not in communication with the source of air.

The front rotary dispensers also have sealing problems. In detail, the prior art front rotary distributors comprise an annular element connected from a first part to a fixed frame which has a source of pressurised fluid and from a second part to a rotary body which has supporting arms for the operating heads.

Moreover, the annular element has one or more seats for receiving pins projecting from the fixed frame to prevent rotations of the annular element relative to the fixed frame.

Elastic elements (springs) are interposed between the annular element and the fixed frame to keep the annular element constantly in contact with the rotary body in a sealed fashion. In light of this, the annular element can move axially towards and away from the fixed frame. In the prior art front rotary distributors, the pressurised air pushes the annular element away from the rotary body, so that beyond a certain pressure value the elastic elements are no longer able to guarantee the contact between the annular element and the rotary body, with consequent lack of seal.

These radial rotary and front rotary distributors are also operated in suction mode. It is therefore possible to connect these distributors to a vacuum source, so that the operating heads can determine a suction at the active path, for example for retaining components of capsules, in phase coordination with other stations/elements of the automatic machine. However, these pneumatic distribution systems also have drawbacks.

In effect, the operating heads simultaneously present in the active path are in fluid communication with each other, so that malfunctions of an operating head at a given instant have a negative and immediate affect on the operating heads present in the active path in the given instant. In other words, if an operating head does not have, or loses, the respective component, the other operating heads present in the active path have an almost immediate suction drop such that it is sometimes no longer able to correctly retain the respective component.

Basically, the prior art rotary distributors do not guarantee independence of operation to the operating heads simultaneously present at a given instant along the active path.

AIM OF THE INVENTION

The aim of this invention is to provide a rotary distributor for a distribution apparatus in automatic machines which overcomes the above-mentioned drawbacks of the prior art.

More specifically, the aim of this invention is to provide a rotary distributor which is able to achieve a high sealing reliability, even over time, maintaining precise feeding and distribution of the fluid with high operating speeds, and reduced dimensions.

A further aim of this invention is to provide a distribution apparatus which is able to render mutually independent the operation of the operating heads present in a given instant along the active path operating in suction mode.

A further aim of this invention is to provide a distribution apparatus for automatic machines which is able to always maintain a correct and proportional distribution of the pressure/vacuum at the operating heads in any specified operating situation.

A further aim is to provide a process for distributing a pressurised fluid to a plurality of user devices in automatic machines which allows a plurality of operating heads to be operated in suction mode in an optimum manner, irrespective of any malfunctions of one of operating heads.

These aims are fully achieved by a rotary distributor, a distribution apparatus, and a process for distributing a pressurised fluid to a plurality of user devices as herein described.

More specifically, the rotary distributes a fluid (gas or liquid) under pressure to a plurality of movable user devices, advantageously in rotation.

The distributor comprises a first element associated with a fixed frame and having a through hole to which is connected a source of pressurised fluid, a selector having a plurality of openings connected to corresponding ducts for the passage of fluid connected to operating heads, and a manifold positioned with a first surface in front of the first element and with a second surface in front of the selector.

The movable user devices are connected to the selector, and movable with it.

The manifold is associated with the first element and with the selector, and has a connection opening which allows the fluid fed under pressure at the first element to pass from the first element to the selector. The opening of the manifold has a dimensional extension which is able to simultaneously touch a predetermined number of openings of the selector in rotation relative to the manifold.

According to the invention, the opening of the manifold is defined by a through slot, open on the first surface positioned in front of the first element and also open on the second surface positioned in front of the selector.

According to the invention, the manifold is shaped to have surfaces which define an area of positive thrust; positive thrust meaning a force applied by the pressurised fluid on the manifold towards the selector, in other words a force for moving the manifold towards the selector.

According to the invention, the manifold may be shaped to have surfaces which define an area of negative thrust; negative thrust meaning a force applied by the pressurised fluid on the manifold towards the first element, in other words a force for moving the manifold away from the selector, providing that the negative thrust is less than the positive thrust.

Advantageously, the through slot does not have surfaces which define an area of negative thrust. Advantageously, the through slot does not have a base.

According to the invention, the manifold is shaped to have surfaces such that the positive thrust is greater than the negative thrust.

According to the invention, the manifold is shaped to have surfaces on which the pressurised fluid generates a zero negative thrust, or less than the positive thrust.

The presence of the through slot on the manifold allows the components of the distributor to be maintained in their correct operating positions, with consequent secure seal between the manifold and the selector.

Preferably, the through slot of the manifold extends for the entire dimensional extension of the opening along the first and the second surfaces.

BRIEF DESCRIPTION OF THE DRAWINGS

These and other features of the invention will become more apparent from the following detailed description of a preferred, non-limiting embodiment of it, with reference to the accompanying drawings, in which.

DETAILED DESCRIPTION OF PREFERRED EMBODIMENTS OF THE INVENTION

FIGS. 1 to 6 show a rotary distributor 13 according to the invention, designed to distribute a fluid (for example air) in pressure to a plurality of movable user devices 1. It is understood that the rotary distributor 13 according to the invention can be used with other types of fluids, both liquid and gaseous, such as nitrogen, or other gases, for example inert, or water, or other liquids.

Figure 7:
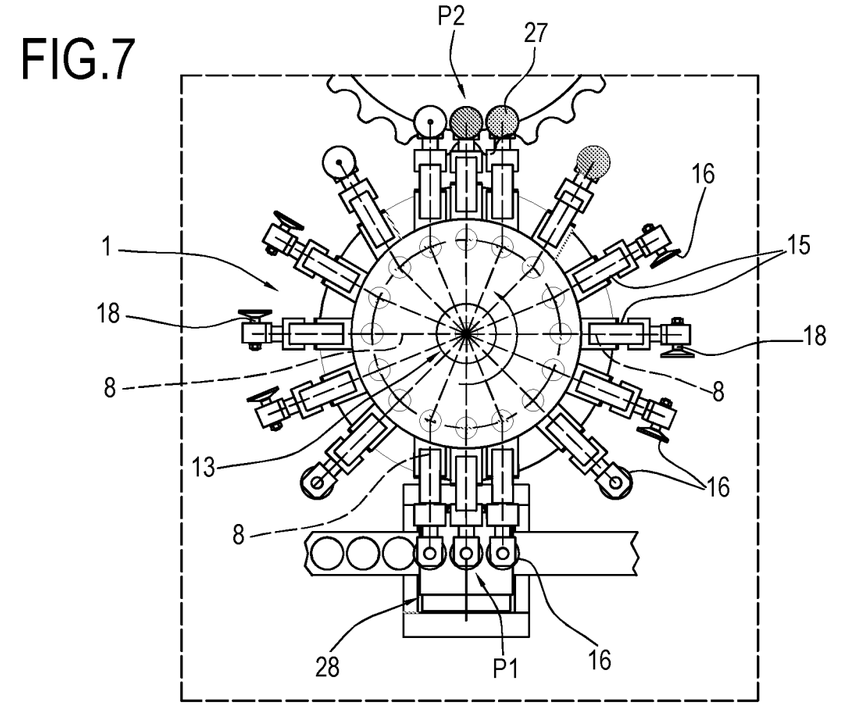
FIG. 7 shows a top plan view of a station of an automatic machine having a distribution apparatus comprising the rotary distributor of the preceding drawings.

By way of example, the movable user device 1 may be part of a distribution apparatus, or rotary station for handling components of capsules being processed on an automatic machine (see FIGS. 7 and 8), or part of filling or cleaning carousels or stations. In alternative embodiments not illustrated, the rotary distributor 13 may be used for filling containers with liquid products.

Figure 1:
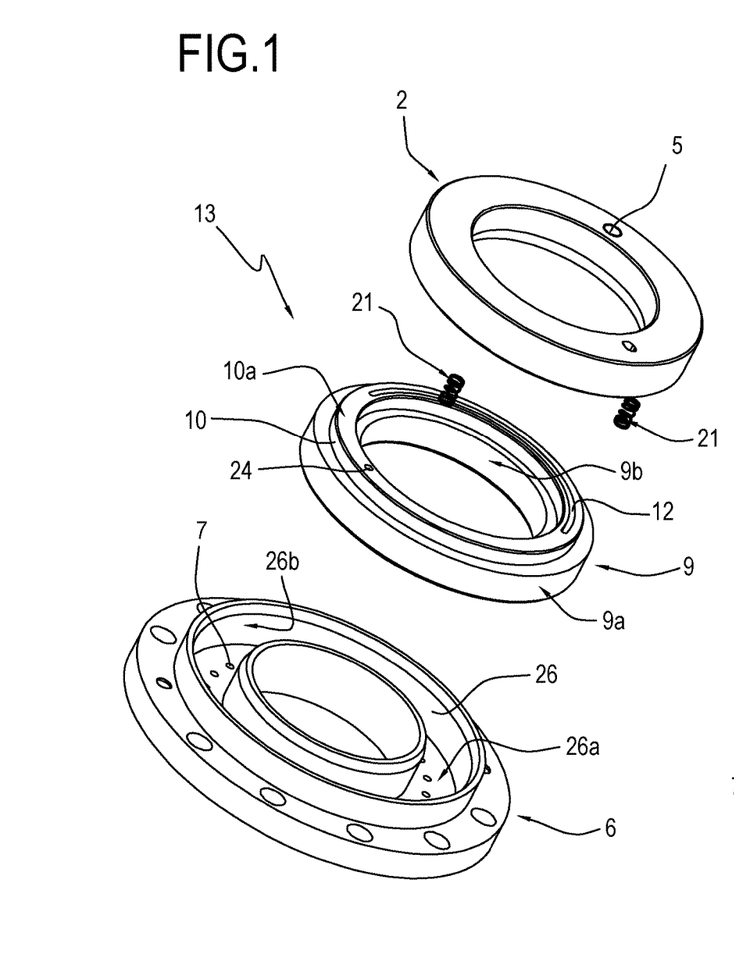
FIGS. 1 and 2 are two different perspective exploded views of a rotary distributor according to this invention.
Figure 2:
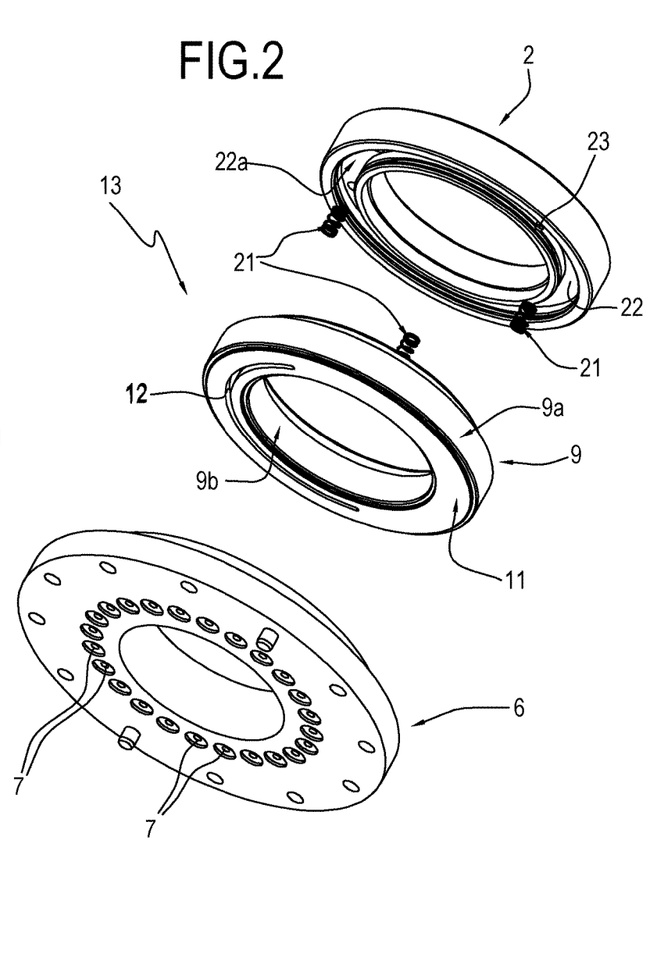
Figure 3:
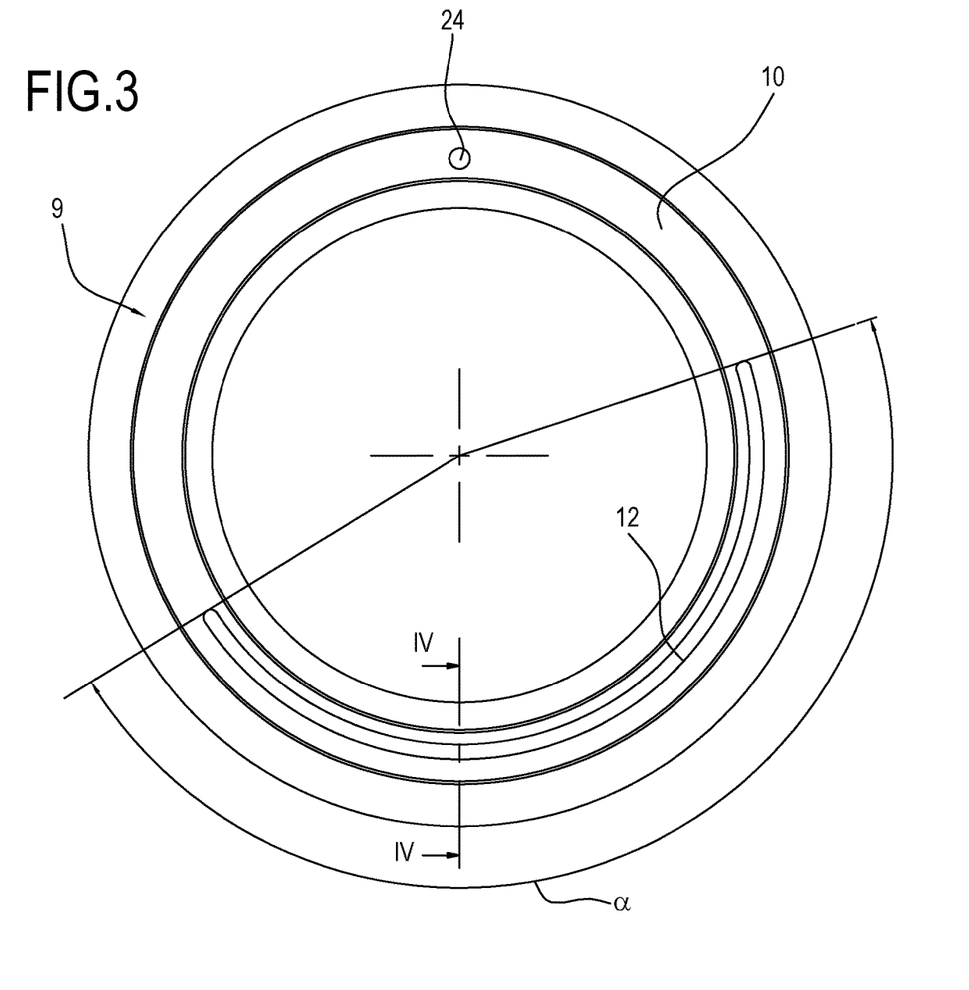
FIG. 3 shows a top plan view of a manifold forming part of the rotary distributor of the preceding drawings.
Figure 4:
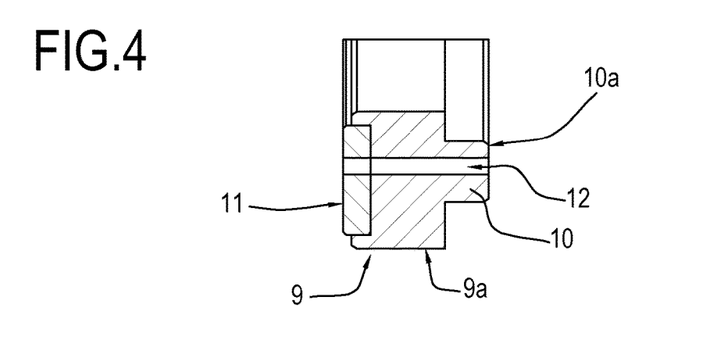
FIG. 4 is a cross section through line IV-IV of FIG. 3.
Figure 5:
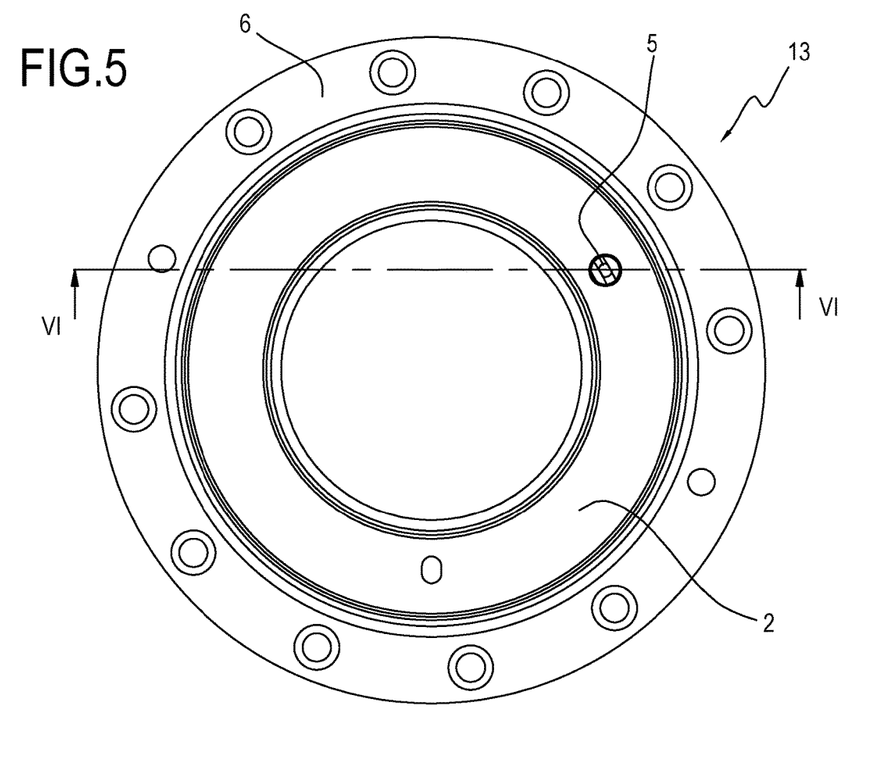
FIG. 5 shows a top plan view of the rotary distributor of FIGS. 1 and 2 in an assembled configuration.

The rotary distributor 13 comprises a first element 2, a selector 6 and a manifold 9.

Figure 6:
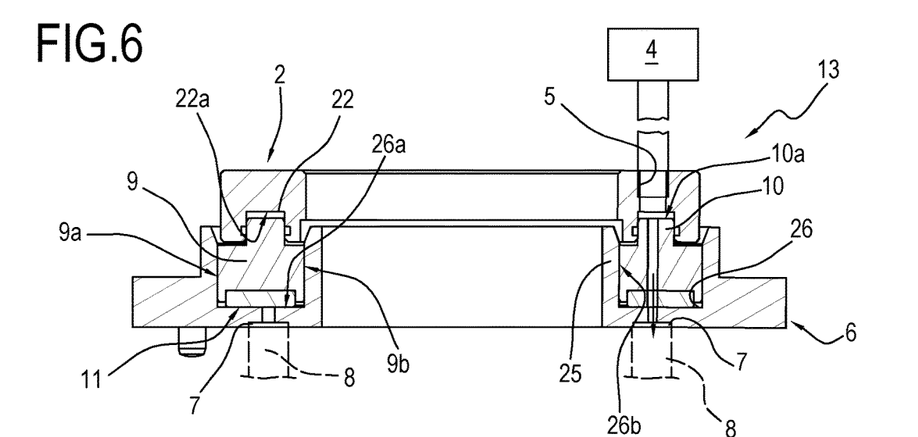
FIG. 6 is a cross section through line IV-IV of FIG. 5.
Figure 8:
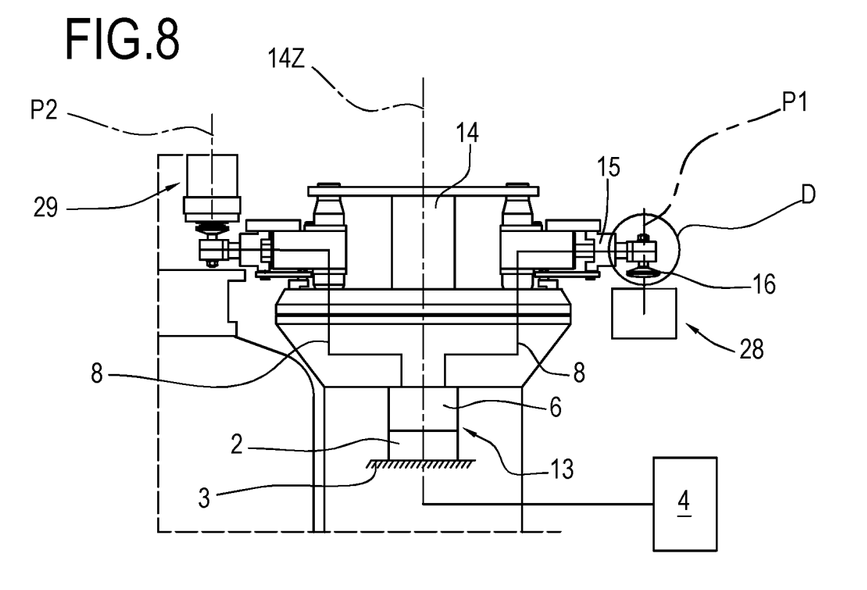
FIG. 8 shows a schematic side view, with some parts cut away in order to better illustrate others, of the station of FIG. 7.

The first element 2 is associated with a fixed frame 3 and has a through hole 5, to which is connected a source 4 of fluid designed to feed pressurised fluid (the source is illustrated with a block in FIGS. 6 and 8). The first element 2 comprises an annular recess 22 which has a bottom wall 22a. Advantageously, the through hole 5 is located at the bottom surface 22a.

The first annular element 2 is provided with a locking pin 23 protruding from the annular recess 22.

The selector 6 has a plurality of openings 7 connected to corresponding ducts for the passage of fluid connected to the corresponding movable user devices 1.

The movable user devices 1 are integral with the selector 6 and movable with it.

The selector 6 is ring-shaped and has a central seat 26, which is also annular. The central seat 26 has a base 26a and side walls 26b.

Advantageously, the openings 7 are made and positioned uniformly along the central seat 26.

The manifold 9 comprises a main body which has an outer lateral surface 9a, an inner lateral surface 9b and an annular protuberance 10, protruding from the main body. The manifold 9 has, at the annular protuberance 10, a first surface 10a positioned in front of the first element 2 and, on the side opposite, at the main body, a second surface 11 positioned in front of the selector 6. The manifold 9 is associated with the first element 2 and has an opening, which allows the fluid under pressure to pass from the first element 2 to the selector 6. Advantageously, the second surface 11 may be formed by an element with a low friction coefficient coupled to the main body (as in the embodiment in the drawings).

The opening of the manifold 9 has a dimensional extension a which is able to simultaneously touch a predetermined number of active openings 7 of the selector 6 (in movement) to allow a passage of fluid towards the same active openings 7 of the selector 6 (in movement). During normal operation, the selector 6 rotates relative to the manifold 9, so that a predetermined number of openings 7 are always in fluid communication with the source 4 through the opening. The number of active openings 7 is a function of the dimensional extension a (in this case angular) of the opening of the manifold 9. In short, the opening of the manifold defines an active path of the movable user devices 1.

The manifold 9 is constrained in rotation stably with the first element 2 by means of the pin 23 which it houses in a hole 24 present on the first surface 10a of the manifold 9. The manifold 9 is, therefore, fixed in rotation relative to the fixed frame 3, whilst the selector 6 is movable in rotation relative to the fixed frame 3, and therefore relative to the manifold 9, about an axis of rotation. The manifold 9 is disengaged relative to the first element 2 axially along the axis of rotation; in other words, the manifold 9 can move along the axis of rotation relative to the first element 2.

Once the manifold 9 is constrained stably in rotation relative to the first element 2, the through hole 5 of the first element 2 will be positioned in front of the opening of the manifold 9 (FIG. 6).

The first element 2, the manifold 9 and the selector 6 (in this example embodiment) have an annular shape and are coaxially positioned, in succession, each on the other along the axis of rotation of the selector 6. In use, the annular protuberance 10 of the manifold 9 is housed in the annular recess 22 of the first element 2, with the first surface 10a of the annular protuberance 10 spaced from the bottom wall 22a of the first element 2. Moreover, side walls of the annular protuberance 10 make sealed contact side with the side walls of the annular recess 22. One or more seals can be provided between the side walls of the annular protuberance 10 and the side walls of the annular recess 22. A first sealed chamber, which in use is filled by the pressurised fluid, is therefore created between the first element 2 and the manifold 9.

On the opposite side, the main body of the manifold 9 is housed in the central seat 26. More specifically, the inner lateral surface 9a and the outer lateral surface 9b of the main body and the second surface 11 of the manifold 9 are designed to slide in a sealed fashion, respectively, on the side walls 26b and on the bottom 26a of the central seat 26.

The first surface 10a of the annular protuberance 10 defines a positive thrust surface of the manifold 9, that is, a surface on which the pressurised fluid applies a force directed towards the selector 6, or, in other words, a force which pushes the manifold 9 towards the selector 6, so that the second surface 11 contacts in a sealed fashion the bottom 26a of the central seat 26.

According to the invention, the opening of the manifold 9 is composed of a through slot 12, open on the first surface 10 positioned in front of the first element 2 and also open on the second surface 11 positioned in front of the selector 6.

Preferably, the through slot 12 of the manifold 9 extends for the entire dimensional extension a of the opening along the first and the second surface 10a and 11.

The slot 12 has side walls parallel to the flow of the fluid.

The slot 12 does not have walls transversal to the flow of the fluid. In other words, the slot 12 has no bottom.

Preferably, the top surface formed by the through slot 12 on the first surface 10a of the manifold 9 is equal to the top surface formed by the through slot 12 on the second surface 11 of the manifold 9.

The opening of the manifold 9 shaped in the form of a through slot 12 represents the preferred embodiment of the invention, because the through slot 12 does not have negative thrust surfaces, that is, surfaces on which the pressurised fluid exerts a force directed towards the first element 2 or, in other words, a force which pushes the manifold 9 towards the first element 2, away from the selector 6.

In other words, in the preferred embodiment illustrated in the drawings, the manifold 9, in particular the through slot 12, has negative thrust surfaces of zero extension.

Different shapes the opening of the manifold 9 are possible, for example also shapes which have negative thrust surfaces, but, according to the invention, these negative thrust surfaces not must cause forces for moving away which are greater than the forces for moving towards. In other words, the manifold 9, in particular the opening of the manifold 9, is shaped in such a way that the pressurised fluid passing through the same opening exerts on the manifold 9 an overall force for moving towards, that is, a force directed towards the selector 6, which guarantees the seal between manifold 9 and selector 6, in particular between the second surface 11 and the bottom 26a of the central seat 26.

In short, the slot 12 present on the manifold 9 allows a direct passage of the fluid without creating, due to the effect of the pressure, forces which move away the manifold 9 from the selector 6: this allows a stability in the positioning of the manifold 9 between the first fixed element 2 and the selector 6.

Advantageously, between the manifold 9 and the fixed element 2 are interposed elastic means 21 for keeping the manifold 9 in constant contact (sliding) with the selector 6.

It should be noted that the elastic means 21, in this embodiment, comprise three different springs. In alternative solutions not illustrated, the elastic elements 21 can comprise two or more springs or thrust elements, designed to push the manifold 9 against the selector 6.

The three springs are positioned at equal angular intervals from each other and are also positioned, each with the relative ends, between the annular recess 22 of the first element 2 and the first surface 10a of the manifold 9. Depending on the force which the pressurised fluid exerts on the positive thrust surfaces and on the negative thrust surfaces (if present), the elastic elements can be omitted. In other words, if the pressurised fluid exerts on the manifold 9 an overall force for moving towards which guarantees in itself the seal between manifold 9 and selector 6, the elastic elements can be omitted.

It should be noted, therefore, that an increase in the pressure of the fluid fed to the rotary distributor 13 according to the invention increases the overall force for moving towards which acts on the manifold 9 and which pushes the manifold 9 towards the selector 6. In other words, with the increase in the pressure of the fluid fed to the rotary distributor 13 the seal increases.

The invention also provides a distribution apparatus for automatic machines (see FIGS. 7 to 10) comprising a rotary distributor 13, as described above, and a carousel.

Preferably, these automatic machines are designed to process infusion or extraction products (yet more preferably coffee, tea, chamomile, chocolate, etc.).

The carousel comprises a body 14 and a plurality of user devices 1, each of which comprises an arm 15 and an operating head 16.

The rotary distributor 13 distributes a fluid (gas or liquid) under pressure to the plurality of user devices 1 as described above.

In the embodiment illustrated, the body 14 rotates about an axis 14Z (vertical), and the plurality of arms 15 are positioned radially protruding from the body 14.

Each arm 15 is equipped with a respective operating head 16 for handling components being processed on the machine automatic. In the embodiment illustrated, an arm 15 and the respective operating head 16 therefore define a movable user device 1. The body 14 is connected to the rotary distributor 13, in particular to the selector 6, for rotating together about the axis 14Z.

In an alternative embodiment not illustrated, the operating head 16 is designed to dispense pressurised fluid, for example air or other inert gas, such as nitrogen, for cleaning edges of single use capsules for infusion or extraction products being packaged.

In a further alternative embodiment not illustrated, the operating head 16 is designed to dispense a liquid, for example for filling a container, or for cleaning a part of the automatic machine.

In the case illustrated and again by way of non-limiting example, each operating head 16 is designed to pick up a piece of film 27 from a forming and feeding station 28 and, after rotating by a certain angle, to release the piece 27 in a sealing station 29 where the piece 27 will be positioned and sealed to further components being processed on the automatic machine to define a finished product (in this case the piece 27 is applied to the mouth of a container for infusion or extraction products, not illustrated, to make a capsule).

The distribution apparatus comprises, for each arm 15, a first duct 8 positioned on the arm 15 for the passage of the fluid.

The first duct 8 is connected, at a first end, to the rotary distributor 13, in particular to the selector 6, whilst at a second end it is free, that is, it allows a release the fluid outside the arm 15 (in short, the first duct 8 leads outside of the arm 15).

Figure 9:
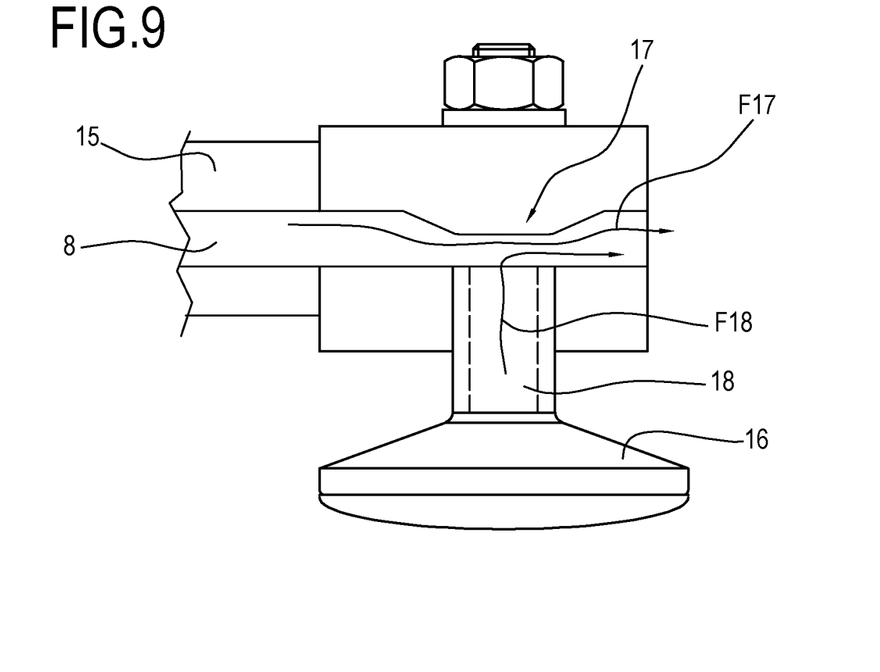
FIG. 9 shows a scaled-up detail D, with some parts cut away to better illustrate others, of a first embodiment of an operating head of FIG. 8.
Figure 10:
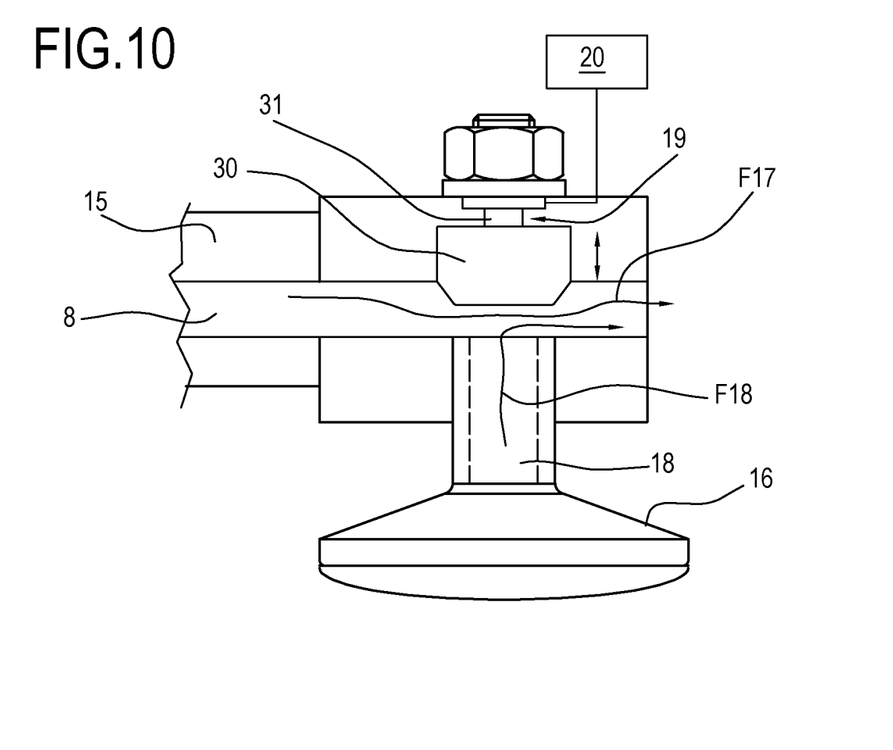
FIG. 10 shows the scaled-up detail D, with some parts cut away to better illustrate others, of a second embodiment of an operating head of FIG. 8.

Advantageously, in the preferred embodiment illustrated in FIGS. 9 and 10, wherein the operating head 16 performs a sucking action, each first duct 8 is equipped with a stretch 17 with a cross section of reduced dimension. In other words, the stretch 17 with a cross section of reduced dimension has a narrowing of the cross section, that is, a region where the passage section of the fluid undergoes a decrease in its size relative to the size of the cross section of the zone upstream and downstream of the region itself (see FIGS. 9 and 10).

The distribution apparatus also comprises, for each first duct 8, a second duct 18 connecting an operating head 16 with a corresponding first duct 8. Advantageously, in the preferred embodiment illustrated in FIGS. 9 and 10, the second duct 18 is connected to the stretch 17 with a reduced cross section of the first duct 8 for generating, by the Venturi effect, a suction of fluid at the operating head 16 towards the first duct 8, in the presence of passage of fluid along the first duct 8 with a direction towards the outside of the arm 15.

The first duct 8 thus defines a Venturi duct and makes it possible to obtain an acceleration of the fluid (with a consequent reduction of the pressure) in such a way as to determine a suction at the second duct 18 and therefore at the operating head 16 (see arrows F17 and F18).

Preferably, the distribution apparatus comprises a source 4 of pressurised fluid which feeds the rotary distributor 13, configured in such a way as to generate a feeding of pressurised fluid inside the first ducts 8. It should be noted that each operating head, according to the preferred embodiment illustrated in FIGS. 7 to 10 (for example), comprises a suction surface 16 supported by the corresponding arm 15.

In short, in this preferred embodiment, the second duct 18 is connected at a first end to the stretch 17 with a reduced cross section of the first duct 8, and, at a second end, to the suction surface 16.

Preferably, each second duct 18 is positioned transversally relative to the corresponding first duct 8.

In light of this, each first and second duct 8 and 18 are inserted inside the corresponding arm 15 and lead, with corresponding second ends, to two different points of the arm 15. Each first duct 8 leads to the free end of the corresponding arm 15, whilst the corresponding second duct 18 (positioned transversally to the first duct 8) leads to the centre of the suction surface 16.

It should be noted that, unlike the prior art rotary distributors connected to a vacuum source, the rotary distributor 13 according to the invention allows the operating heads to be operatively disconnected. In other words, by feeding pressurised fluid to the rotary distributor 13, any malfunctions of an operating head, for example a failure to pick up the piece of film 27 by an operating head, do not have an affect on the other operating heads present in the operating stretch, which, on the contrary, may continue to suck in an optimum fashion.

An alternative embodiment of the distribution apparatus is illustrated in FIG. 10.

In this alternative embodiment, the distribution apparatus comprises a device 19 for adjusting of the cross section of each first duct 8.

The adjusting device 19 is positioned at the stretch 17 with a reduced cross section of each first duct 8.

In light of this, the adjusting device 19 is controlled by a unit 20 for controlling the apparatus (illustrated as a block) to increase or decrease the cross section of the stretch 17 with a reduced cross section, in such a way as to vary, increasing or decreasing, the speed of the fluid in the stretch 17 with reduced section of the first duct 8.

Preferably, the adjusting device 19 comprises a shutter 30 positioned transversely inside the first duct 8. The shutter 30 is controlled by a linear actuator 31 positioned inside the arm 15.

The actuator 31 is, in turn, connected to the control unit 20 which, on the basis of (for example) signals correlated with an increase or decrease of pressure inside the first ducts 8 may drive the shutter 30 downwards or upwards to increase or decrease the cross section of the stretch 17 and, consequently, the speeds of the fluid with relative increase or decrease in the suction of the suction surfaces 16.

The adjustment of the cross section of the stretch 17 can be advantageously used for modifying the suction according to the greater or lesser rigidity of the components to be handled in the station.

As stated above, the stretch 17 with a reduced cross section is advantageously used for producing a suction at the operating heads 16, but it is not necessary if the suction is not requested. For example, if a dispensing of pressurised fluid by the operating heads is requested, for example for cleaning the neck of the capsule before a subsequent operation for sealing a portion 27 of sealing sheet to the neck, or for dispensing a liquid (for filling or cleaning purposes), the stretch 17 with a reduced cross section may advantageously be omitted. In this case, the first duct 8 may advantageously flow into the second duct 18, so that it is in direct communication with the operating head 16. In other words, the second end of the first duct 8 may be connected to the first end of the second duct 18, in such a way as to form a single duct which places in communication the selector 6 with the operating heads 16.

The distribution apparatus, upstream of the user devices, is therefore equipped with a rotary distributor fed with fluid (air, nitrogen, other gas, or liquids) under pressure, whilst downstream of the user devices the fluid under pressure is dispensed, or a suction is generated, by a neck (even adjustable) in a feed duct which generates, by the Venturi effect, a negative pressure.

Moreover, the distribution apparatus comprising a first duct with a stretch with a reduced cross section, operating to generate a suction, is not affected by malfunctions of the other movable user devices located in the operating path, generating a constant suction in all the movable user devices present along the operating path, irrespective of the status of the movable user devices.

This type of distribution guarantees a high and constant quality of gripping and releasing of the components by the operating heads, keeping the components of the system almost unchanged.

To this must be added the high reliability of the rotary distributor which, in this situation, must solely maintain under pressure the pneumatic distribution apparatus of the operating station.

The preferred embodiment of the distribution apparatus according to the invention which comprises the stretch 17 with a reduced cross section also has numerous advantages. Firstly, it is possible to position the stretch with a reduced cross section in the vicinity of the operating head, so as to obtain immediate suction and reduced load losses. It is also possible limit the problems of soiling of the ducts. More specifically, it should be noted how the first duct, as it is fed with pressurised fluid, may not become soiled due to the suction of operating heads, with any soiling problems being limited to the second duct.

This invention also provides a process for distributing a pressurised fluid to a plurality of user devices 1 in an automatic machine comprising the following steps:
preparing a rotary distributor as described above;
preparing a carousel, comprising a rotary body 14 and the plurality of user devices 1, each user device comprising an arm 15 and an operating head 16;
connecting the rotary distributor to the carousel, for putting in fluid communication the user devices 1 with the rotary distributor;
adjusting the pressure of the fluid, so as to obtain a pressurised fluid;
introducing the pressurised fluid in the rotary distributor;
feeding the pressurised fluid selectively to the plurality of user devices 1.
Advantageously, the process also comprises:
preparing for each user device 1 a first duct 8 with a stretch 17 with a reduced cross section positioned on a respective arm 15 for the passage of the fluid; the first duct 8 being connected, at a relative first end, to the rotary distributor 13 and, at a relative second end, allowing release of the fluid outside the respective arm 15;
preparing for each user device 1 a second duct 18 connected, at a relative first end, to a respective stretch 17 with a reduced cross section of a respective first duct 8 and, at a relative second end, to a respective operating head 16;
picking up, by suction, components being processed by means of the operating heads 16;
moving the components being processed from a first point P1 to a second point P2;
selectively deactivating the step of feeding the pressurised fluid selectively to the first ducts 8;
releasing the components being processed in the second point P2 due to the step of selectively deactivating the step of feeding the pressurised fluid selectively to the first ducts 8.

Advantageously, the rotary distributor in which to introduce the pressurised fluid is a rotary distributor 13 according to the invention.

The invention claimed is:

1. A rotary distributor for distributing a pressurised fluid to a plurality of movable user devices, comprising:
   a first element associated with a fixed frame and comprising a through hole to which is connected a source of pressurised fluid;
   a selector having a plurality of openings connected to corresponding ducts for the passage of fluid connected to the corresponding movable user devices, the selector being connected integrally to the movable user devices and movable in rotation relative to the fixed frame;
   a manifold with a first surface positioned in front of the first element and with a second surface positioned in front of the selector; the manifold being associated with the first element, and having an opening for connection and passage of fluid between the first element and the selector; the opening having a dimensional extension which is able to simultaneously touch a predetermined number of openings of the selector in movement to allow the passage of fluid from the source of pressurised fluid towards the openings of the selector in movement; the manifold being shaped in such a way that the pressurised fluid fed through the through hole exerts on the manifold a total force directed towards the selector.

2. The rotary distributor according to claim 1, wherein the manifold has positive thrust surfaces, on which the pressurised fluid exerts a force directed towards the selector and negative thrust surfaces, on which the pressurised fluid exerts a force directed towards the first element, the positive thrust surfaces resulting in a force for moving towards which is greater than the force for moving away resulting from negative thrust surfaces.

3. The rotary distributor according to claim 1, wherein the opening of the manifold is defined by a through slot, open on the first surface positioned in front of the first element and also open on the second surface positioned in front of the selector.

4. The rotary distributor according to claim 3, wherein the through slot of the manifold extends for the entire dimensional extension of the opening along the first and the second surface.

5. The rotary distributor according to claim 3, wherein at least the first and the second surface of the manifold and corresponding surfaces of the first element and of the selector positioned in front of them have an annular shape, and the through slot of the manifold extends according to an arc of a circle for the entire dimensional extension of the opening.

6. The rotary distributor according to claim 3, wherein the manifold has negative thrust surfaces of zero extension and the through slot has no bottom.

7. The rotary distributor according to claim 2, wherein the first surface of the manifold defines the positive thrust surface.

8. A distribution apparatus for automatic machines comprising:
   a rotary distributor according to claim 1;
   a carousel, comprising:
   a rotary body;

a plurality of user devices, each user device comprising an arm and an operating head, the carousel being connected to the rotary distributor for putting in fluid communication the user devices with the rotary distributor.

9. The distribution apparatus according to claim 8, wherein the rotary body rotates about an axis of rotation and rotates the plurality of user devices about the axis of rotation.

10. The distribution apparatus according to claim 8, comprising:

first ducts positioned on respective arms for the passage of the fluid; the first ducts being connected, at a first end, to the rotary distributor and, at a second end, allowing a release of the fluid outside of the arm;

second ducts connected, at a first end, to respective first ducts and, at a second end, to respective operating heads.

11. The distribution apparatus according to claim 8, comprising a source of pressurised fluid which feeds the rotary distributor in such a way as to generate a supply of pressurised fluid inside the first ducts.

12. The distribution apparatus according to claim 10, wherein the second ducts are positioned transversely relative to respective first ducts.

13. The distribution apparatus according to claim 10, wherein the first ducts have respective stretches with a reduced cross section, and wherein the operating heads comprise respective suction surfaces, the second ducts being connected, at a first end, to the respective stretches with a reduced cross section of the first ducts and, at a second end, to the respective suction surfaces, the stretches with a reduced cross section generating, by the Venturi effect, a suction at the respective suction surfaces.

14. The distribution apparatus according to claim 13, wherein each first and second duct are inserted inside the corresponding arm and lead, with corresponding second ends, to two different points.

15. The distribution apparatus according to claim 13, comprising an adjusting device designed to adjust the cross section of the stretch with a reduced cross section, and a control unit designed to control the adjusting device to increase or decrease the cross section of the stretch with a reduced cross section, in such a way as to increase or decrease the speed of the fluid in the stretch with a reduced cross section and, consequently, the suction at the suction surfaces.

16. The distribution apparatus according to claim 10, wherein the second end of the first duct is connected to the first end of the respective second duct.

17. A process for distributing a pressurised fluid to a plurality of user devices in an automatic machine, wherein it comprises the following steps:

providing a rotary distributor according to claim 1;

providing a carousel, comprising a rotary body and the plurality of user devices, each user device comprising an arm and an operating head;

connecting the rotary distributor to the carousel, for putting in fluid communication the user devices with the rotary distributor;

adjusting the pressure of the fluid, so as to obtain a pressurised fluid;

introducing the pressurised fluid in the rotary distributor;

feeding the pressurised fluid selectively to the plurality of user devices.

18. The process according to claim 17, also comprising:

providing for each user device a first duct with a stretch with a reduced cross section positioned on a respective arm for the passage of the fluid; the first duct being connected, at a first end, to the rotary distributor and, at a second end, allowing a release of the fluid outside the respective arm;

providing for each user device a second duct connected, at a first end, to a respective stretch with a reduced cross section of a respective first duct and, at a second end, to a respective operating head;

picking up, by suction, components being processed by means of the operating heads;

moving the components being processed from a first point to a second point;

selectively deactivating the step of feeding the pressurised fluid selectively to the first ducts;

releasing the components being processed in the second point due to the step of selectively deactivating the step of feeding the pressurised fluid selectively to the first ducts.

* * * * *